United States Patent
Maestre

[19]

[11] Patent Number: 6,087,742
[45] Date of Patent: Jul. 11, 2000

[54] HYBRID LINEAR MOTOR

[75] Inventor: Jean-Francois Maestre, Djon, France

[73] Assignee: Parvex, Dijon, France

[21] Appl. No.: 09/107,667

[22] Filed: Jun. 30, 1998

[30] Foreign Application Priority Data

Jul. 3, 1997 [FR] France .................................. 97 08437

[51] Int. Cl.$^7$ ................................................ H02K 41/00
[52] U.S. Cl. .............................. 310/12; 310/12; 310/13; 310/14
[58] Field of Search .............. 310/12–14, 49 R

[56] References Cited

U.S. PATENT DOCUMENTS

| | | | |
|---|---|---|---|
| 4,563,602 | 1/1986 | Nagasaka ................................... | 310/12 |
| 4,745,312 | 5/1988 | Nagasaka ................................... | 310/12 |
| 5,065,061 | 11/1991 | Satoh et al. .............................. | 310/12 |

OTHER PUBLICATIONS

Patent Abstracts of Japan, vol. 010, No. 046 (E–383), Feb. 22, 1986 & JP 60 200757 A (Yasukawa Denki Seisakusho KK), Oct. 11, 1985 **.

*Primary Examiner*—Elvin Enad
*Attorney, Agent, or Firm*—Ware, Fressola, Van Der Sluys & Adolphson LLP

[57] ABSTRACT

A linear motor comprising a first portion having: a primary magnetic circuit comprising $N_e$ slots alternating with $N_d$ teeth, with $N_e=N_d$, a multiphase electrical winding having 2P poles being placed inside said slots and, at an instant t when fed with AC, producing an undulated magnetic field of length l and of P periods along the length l of the magnetic circuit covering the $N_e$ slots and the $N_d$ teeth; and a second portion, disposed facing the first portion and separated therefrom by a plane air gap, said second portion having a length L=l+x, where x is the length of relative displacement between the two portions relative to each other, said second portion constituting a secondary magnetic circuit; wherein, facing said air gap, said secondary magnetic circuit comprises a series of teeth and slots along its entire length L, wherein said first portion comprises, along said air gap, and fixed to the primary magnetic circuit at the end of its teeth and its slots, a series of $2N_e=2N_d$ magnets of alternating polarity covering all of said length l of said primary magnetic circuit, wherein the number $n_e$ of slots over a length l of the secondary magnetic circuit is $n_e=N_e+P$, or else $n_e=N_e-P$, and wherein, over a same length l, the number $n_d$ of teeth is equal to $n_e$.

1 Claim, 2 Drawing Sheets

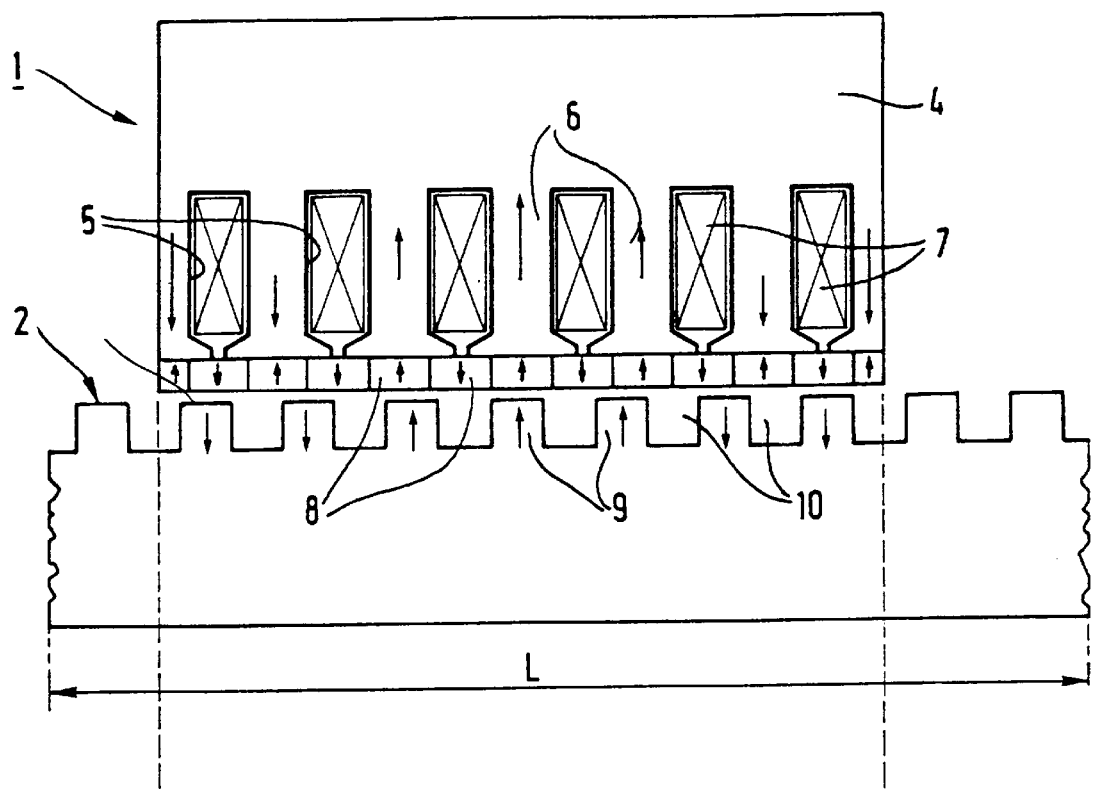
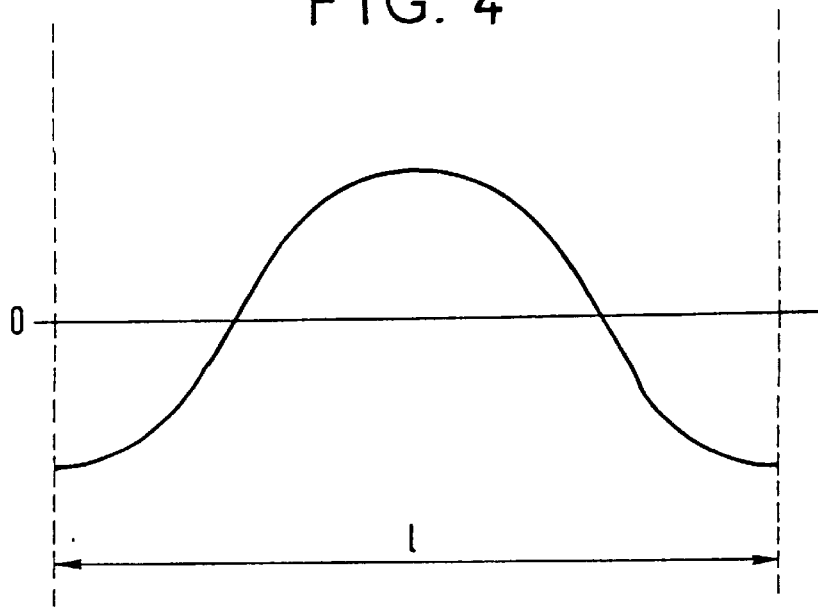

HYBRID LINEAR MOTOR

BACKGROUND OF THE INVENTION

A known advantage of linear motors is to avoid using means for transforming rotary motion into movement in translation.

However, in linear motors, the primary portion includes a winding, and the secondary portion, whose length is equal to that of the primary portion plus its displacement stroke and can therefore be very long, includes either a winding of the cage type, when the linear motor is of the asynchronous type, or permanent magnets, when the linear motor is of the synchronous type. In both cases, such a motor is costly, especially if its stroke is long: for an asynchronous linear motor, the secondary winding must be cooled; and for a synchronous motor having magnets, magnets based on rare-earths are generally used, thereby making it too costly for a stroke of significant length; in addition, the magnets strongly attract any magnetic material and the motor must be closed inside a sealed chamber which is difficult to achieve and costly.

A hybrid linear stepper motor is also known. In such a motor, the primary portion comprises a magnetic circuit including teeth and slots along an air gap, and split in two by a magnet, each magnetic half-circuit is provided with an electrical coil, both coils being fed by a current which is offset by 90° from one coil to the other. The secondary portion is a magnetic circuit possessing teeth and slots. Such a motor is inexpensive but very bulky. A continuous flux passes through the stator laminations and is amplitude modulated by passing via the teeth, but the flux is never reversed. The force density per unit area of this type of motor is about one third of that of a motor where the flux is reversed in the laminations.

OBJECT AND SUMMARY OF THE INVENTION

An object of the present invention is to propose a linear motor which mitigates the above-mentioned drawbacks and which is therefore of low cost, and much smaller than the motor of the hybrid type for the same nominal force.

The present invention therefore proposes a linear motor comprising a first portion having: a primary magnetic circuit comprising $N_e$ slots alternating with $N_d$ teeth, with $N_e=N_d$, a multiphase electrical winding having 2P poles being placed inside said slots and, at an instant t when fed with AC, producing an undulated magnetic field of length 1 and of P periods along the length 1 of the magnetic circuit covering the $N_e$ slots and the $N_d$ teeth; and a second portion, disposed facing the first portion and separated therefrom by a plane air gap, said second portion having a length L=l+x, where x is the length of relative displacement between the two portions relative to each other, said second portion constituting a secondary magnetic circuit; wherein, facing said air gap, said secondary magnetic circuit comprises a series of teeth and slots along its entire length L, wherein said first portion comprises, along said air gap, and fixed to the primary magnetic circuit at the end of its teeth and its slots, a series of $2N_e=2N_d$ magnets of alternating polarity covering all of said length 1 of said primary magnetic circuit, wherein the number $n_e$ of slots over a length 1 of the secondary magnetic circuit is $n_e=N_e+P$, or else $n_e=N_e-P$, and wherein, over a same length 1, the number $n_d$ of teeth is equal to $n_e$.

It should noted that in that definition of the invention, and in the description below, a complete tooth or a complete slot is counted as one unit, and thus, if the primary magnetic circuit includes a half-tooth at each of its ends, said two half-teeth together count as a single tooth. The same applies for the slots and for the magnets.

BRIEF DESCRIPTION OF THE DRAWINGS

An embodiment of the invention is described below with reference to the accompanying drawings, in which:

FIGS. 3 and 4 are respectively equivalent to FIGS. 1 and 2, but after relative displacement by a distance equal to one slot of the secondary magnetic circuit.

BEST MODE FOR CARRYING OUT THE INVENTION

Figure 1:
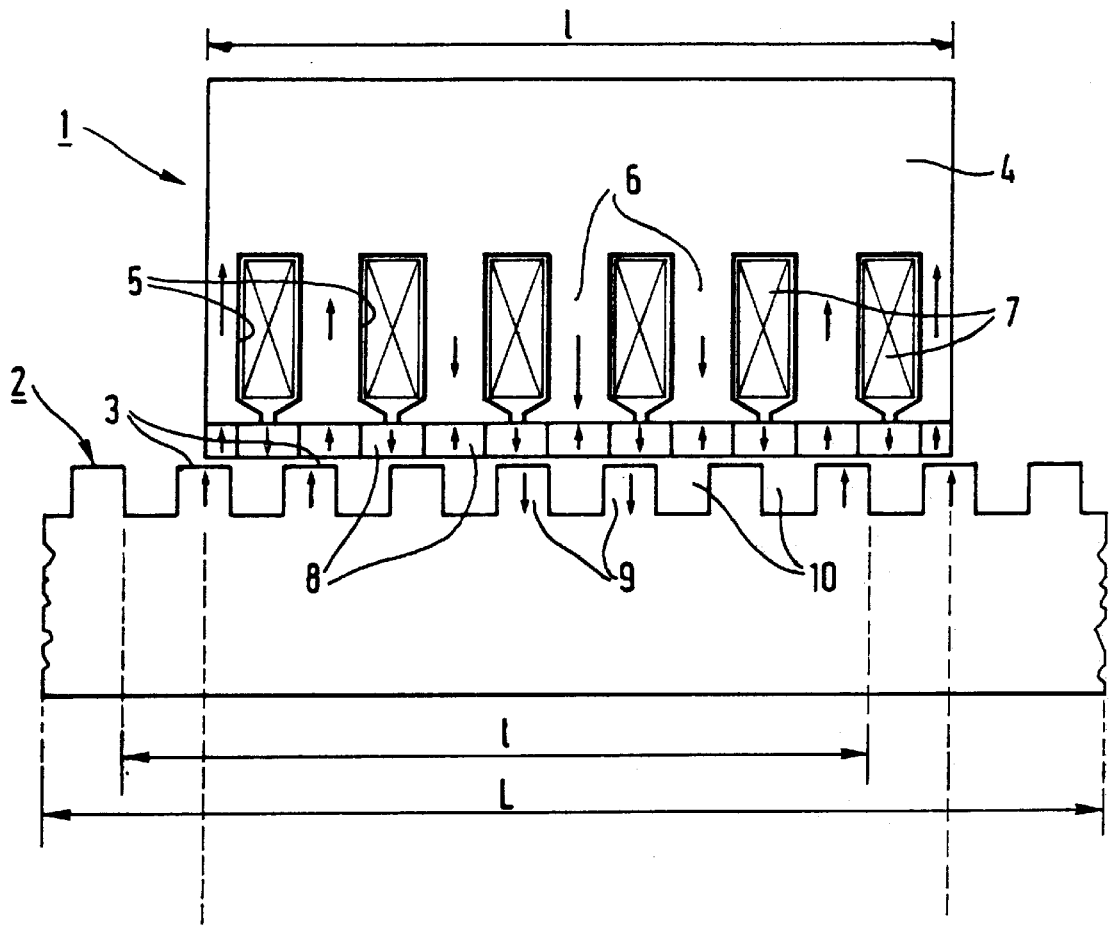
FIG. 1 is a diagrammatic view showing a linear motor of the invention having two poles: P=1.

With reference to FIG. 1, a linear motor of the invention can thus be seen comprising a first portion 1 and a second portion 2, separated by a plane air gap 3.

The first portion 1 has a primary magnetic circuit 4 of length 1, including an equal number of slots 5 and teeth 6.

In the example shown, the number of slots is six: $N_e=6$, therefore the number of teeth is also six: $N_d=6$, comprising five whole teeth and one half-tooth at each end of the circuit. Such a linear motor should be thought of as a circular motor which has been split and flattened out.

This disposition, with a half-tooth at each end, is the most practical, in particular for placing windings in the slots 5, but, in addition to this disposition, two other dispositions are also possible: a slot at one end and a tooth at the other, or even a half-slot at each end. The slots 5 are provided with a multiphase winding 7 having 2P poles, producing a sliding field.

The example relates to a three-phase winding having two poles 2P=2.

Along the air gap 3, along the entire length 1 of the primary magnetic circuit 4, and fixed thereto at the ends of the teeth and of the slots, the first portion 1 is also provided with a series of $2N_e=2N_d$ magnets 8 of alternating polarity as indicated by the arrows.

In the example described, there are thus twelve magnets: $2N_e=12$. As mentioned above, there are $2N_e$ whole magnets. In the present case, eleven whole magnets and one magnet cut in two, having one half placed at one end, and the other half at the other end. The second portion 2 is disposed facing said first portion 1 and is separated therefrom by the plane air gap 3. The second portion 2 is a secondary magnetic circuit which comprises a series of teeth 9 and slots 10 along its entire length L, which is equal to the length 1 of the first portion plus the displacement stroke x of one of the portions relative to the other.

Along a length 1 of the secondary magnetic circuit, there are $n_e$ slots 10 and $n_d$ teeth 9, with $n_e=n_d=N_e+P$, or else $n_e=n_d=N_e-P$.

In the example described, it can be seen that $N_e=N_d=6$ and that P=1, so $n_e=N_e+P=7$.

There are therefore seven teeth and seven slots along a length 1 of the secondary magnetic circuit 2.

Thus, by means of the magnets 8 of alternating polarity and a secondary magnetic circuit 2 having teeth and slots, variable reluctance exists along the air gap 3 producing flux which varies along the air gap and which possesses 2P poles, ignoring any flux induced by the winding 7.

Figure 2:
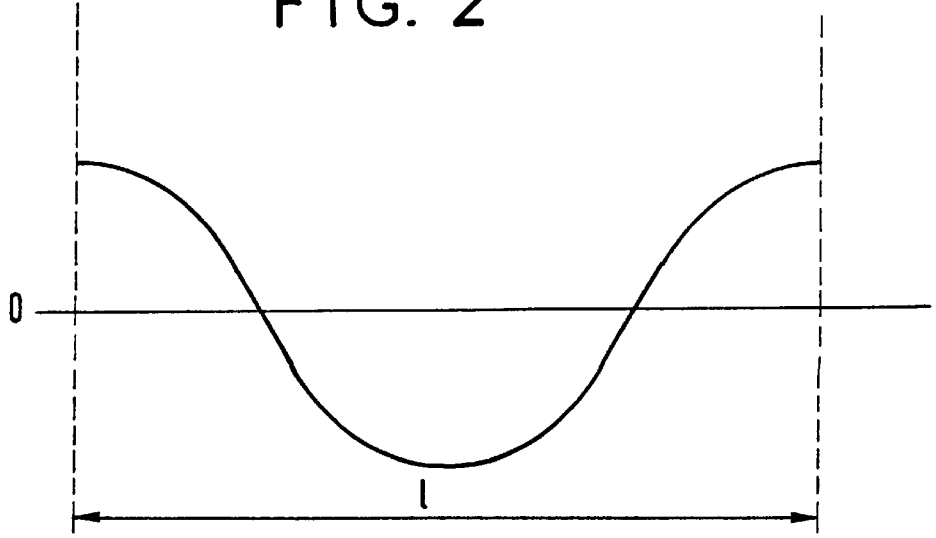
FIG. 2 shows, at an instant t, the value of the flux along the air gap of the motor of FIG. 1, created by cooperation between the magnets of the primary magnetic circuit, and the teeth and slots of the secondary magnetic circuit.

The arrows on the primary magnetic circuit 4 represent the magnitude and the direction of the magnetic flux inside the teeth 6. The flux is also represented by the curve of FIG. 2. Along the length 1 of the primary magnetic circuit, there are a number of complete spatial periods, (one period shown), since the construction shown is for two poles (in the position shown, one complete pole in the center and half a pole at each end). These poles are due to the construction of the machine, using the magnets and the secondary magnetic circuit with teeth and slots.

The multiphase winding 7 must be designed to have the same number of poles, i.e. here, 2P=2.

Cooperation between the "sliding" poles produced by the multiphase winding 7 fed with AC, and the poles resulting from the above constructive disposition produces a displacement force.

In said construction, the secondary magnetic circuit has neither magnets nor a winding, and in addition, the flux inside each tooth 6 of the primary magnetic circuit (flux produced by the magnets 8) is reversed each time it is displaced by a distance equal to one slot (or one tooth) of the secondary magnetic circuit 2, as shown in FIGS. 3 and 4 which are identical to FIGS. 1 and 2, except that the first portion 1 has been displaced by a length equal to one tooth 9.

A linear motor is thus obtained with its long portion (generally the fixed portion) having neither magnets nor a winding, while nevertheless delivering good force since alternating flux reversal is obtained in the teeth of the primary magnetic circuit, unlike the hybrid linear motor mentioned in the introduction.

What is claimed:

1. A linear motor comprising a first portion having: a primary magnetic circuit comprising $N_e$ slots alternating with $N_d$ teeth, with $N_e=N_d$, a multiphase electrical winding having 2P poles being placed inside said slots and, at an instant t when fed with AC, producing an undulated magnetic field of length l and of P periods along the length l of the magnetic circuit covering the $N_e$ slots and the $N_d$ teeth; and a second portion, disposed facing the first portion and separated therefrom by a plane air gap, said second portion being displaceable relative to said first portion and having a length L=l+x, where x is the length of the displacement of said second portion relative to said first portion, said second portion constituting a secondary magnetic circuit; wherein, facing said air gap, said secondary magnetic circuit comprises a series of teeth and slots along its entire length L, wherein said first portion comprises, along said air gap, and fixed to the primary magnetic circuit at the end of its teeth and its slots, a series of $2N_e=2N_d$ magnets of alternating polarity covering all of said length l of said primary magnetic circuit, wherein the number $n_e$ of slots over a length l of the secondary magnetic circuit is $n_e=N_e+P$, or else $n_e=N_e-P$, and wherein, over a same length l, the number $n_d$ of teeth is equal to $n_e$.

* * * * *

UNITED STATES PATENT AND TRADEMARK OFFICE
CERTIFICATE OF CORRECTION

PATENT NO. : 6,087,742
DATED : July 11, 2000
INVENTOR(S) : Jean-Francois Maestre It is certified that error appears in the above-indentified patent and that said Letters Patent is hereby corrected as shown below:

On the title page:

In References Cited [56] under Other Publications, please insert
--EP 0 230 605 A, Yaskawa Denki Seisakusho KK, August 5, 1987-- and
--EP 0 385 203 A, Yaskawa Denki Seisakusho KK, September 5, 1990--.

In the Abstract [57], line 6, after "instant", "t" should be --$\underline{t}$--.

In the Abstract [57], line 12, after "where", "x" should be --$\underline{x}$--.

In column 1, line 2, please insert --TECHNICAL FIELD--.

In column 1, prior to line 3, please insert --The present invention relates to a linear motor--.

In column 1, line 46, after "instant", "t" should be --$\underline{t}$--.

In column 1, line 51, after "where", "x" should be --$\underline{x}$--.

In column 2, line 10, after "instant", "t" should be --$\underline{t}$--.

In column 2, line 53, after "stroke, "x" should be --$\underline{x}$--.

Signed and Sealed this

Seventeenth Day of April, 2001

Attest:

NICHOLAS P. GODICI

Attesting Officer   Acting Director of the United States Patent and Trademark Office